US012569909B2

(12) United States Patent
Mizobe et al.

(10) Patent No.: US 12,569,909 B2
(45) Date of Patent: Mar. 10, 2026

(54) METAL POWDER FOR 3D PRINTER, SHAPED ARTICLE, AND METHOD FOR MANUFACTURING SHAPED ARTICLE

(71) Applicants: KABUSHIKI KAISHA TOSHIBA, Tokyo (JP); TOSHIBA MATERIALS CO., LTD., Yokohama (JP)

(72) Inventors: Masanori Mizobe, Shinagawa (JP); Shinichi Yamamoto, Fujisawa (JP); Tadashi Ino, Yokohama (JP); Tooru Tanaka, Yokosuka (JP); Hideshi Nakano, Fujisawa (JP)

(73) Assignee: Niterra Materials Co., Ltd., Yokohama (JP)

( * ) Notice: Subject to any disclaimer, the term of this patent is extended or adjusted under 35 U.S.C. 154(b) by 0 days.

(21) Appl. No.: 18/508,389

(22) Filed: Nov. 14, 2023

(65) Prior Publication Data

US 2024/0082909 A1 Mar. 14, 2024

Related U.S. Application Data

(63) Continuation of application No. 16/951,304, filed on Nov. 18, 2020, now abandoned, which is a
(Continued)

(30) Foreign Application Priority Data

May 30, 2018 (JP) ................................. 2018-103587

(51) Int. Cl.
B22F 1/052 (2022.01)
B22F 1/065 (2022.01)
(Continued)

(52) U.S. Cl.
CPC .............. B22F 1/052 (2022.01); B22F 1/065 (2022.01); B33Y 70/00 (2014.12); B33Y 80/00 (2014.12);
(Continued)

(58) Field of Classification Search
CPC .......... B22F 1/052; B22F 1/065; B22F 10/28; B22F 10/36; B22F 2301/20;
(Continued)

(56) References Cited

U.S. PATENT DOCUMENTS 9,780,011 B2 10/2017 Imamura et al.
2004/0219087 A1 11/2004 Mohri et al.
(Continued)

FOREIGN PATENT DOCUMENTS

CN 1114503 A 1/1996
CN 103619779 A 3/2014
(Continued)

OTHER PUBLICATIONS

Tang et al. Effect of Powder Reuse Times on Additive Manufacturing of Ti-6Al-4V by Selective Electron Beam Melting, JOM, vol. 67, No. 3, 2015, DOI: 10.1007/s11837-015-1300-4, Published online Feb. 5, 2015 (Year: 2015).*
(Continued)

*Primary Examiner* — Rebecca Janssen
(74) *Attorney, Agent, or Firm* — BURR PATENT LAW, PLLC

(57) ABSTRACT

A metal powder for 3D printer includes a plurality of metal particles. A particle size distribution of the plurality of metal particles has a maximum peak within particle diameters of 1 μm to 200 μm. The particle size distribution gives a difference $D_{90}-D_{10}$ of 10 μm or more between $D_{90}$ and $D_{10}$, $D_{90}$ denoting a particle diameter in which a cumulative percentage is 90% in volume proportion, and $D_{10}$ denoting
(Continued)

a particle diameter in which a cumulative percentage is 10% in volume proportion.

9 Claims, 2 Drawing Sheets

Related U.S. Application Data continuation of application No. PCT/JP2019/021319, filed on May 29, 2019.

(51) Int. Cl.

| | |
|---|---|
| *B33Y 70/00* | (2020.01) |
| *B33Y 80/00* | (2015.01) |
| *B22F 10/28* | (2021.01) |
| *B22F 10/36* | (2021.01) |

(52) U.S. Cl.
CPC .............. *B22F 10/28* (2021.01); *B22F 10/36* (2021.01); *B22F 2301/20* (2013.01); *B22F 2301/25* (2013.01)

(58) Field of Classification Search
CPC ........ B22F 2301/25; B22F 9/082; B22F 1/05; B22F 9/14; B33Y 70/00; B33Y 80/00; B33Y 10/00; Y02P 10/25; C22C 1/045
See application file for complete search history.

(56) References Cited

U.S. PATENT DOCUMENTS

| | | | |
|---|---|---|---|
| 2006/0214335 A1* | 9/2006 | Cox ........................ | B22F 10/28 425/375 |
| 2016/0193658 A1 | 7/2016 | Miyasaka | |

| | | | |
|---|---|---|---|
| 2017/0209925 A1 | 7/2017 | Kataoka et al. | |
| 2017/0334023 A1* | 11/2017 | Mohr ....................... | B22F 7/08 |
| 2018/0127866 A1* | 5/2018 | Irumata ................... | B22F 10/28 |
| 2020/0063242 A1* | 2/2020 | Valls Anglés ......... | B22F 3/1233 |
| 2024/0082909 A1 | 3/2024 | Mizobe et al. | |

FOREIGN PATENT DOCUMENTS

| | | |
|---|---|---|
| CN | 106794520 A | 5/2017 |
| CN | 112166004 A | 1/2021 |
| JP | 2009-270130 A | 11/2009 |
| JP | 2016-102229 A | 6/2016 |
| JP | 2018-080359 A | 5/2018 |
| WO | 2015/041236 A1 | 3/2015 |
| WO | 2017/115648 A1 | 7/2017 |

OTHER PUBLICATIONS

International Search Report and Written Opinion (Application No. PCT/JP2019/021319) dated Aug. 27, 2019.

Extended European Search Report (Application No. 19811569.3) dated Jan. 11, 2022.

Loreen Wermuth et al., "*Selective Laser Melting of Noble and Refractory Alloys for New Generation Spacecraft Thruster*," Metallic Materials and Process: Industrial Challengers-MMP 2015, Nov. 2015.

Christopher T. Schade et al., "*Development of Atomized Powders for Additive Manufacturing*," Advances in Powder Metallurgy and Particulate Materials-2014, Proceedings of the 2014 World Congress on Powder Metallurgy and Particulate Materials, 2014.

Chinese Office Action (Application No. 202310762316.3) dated Dec. 10, 2025 (7 pages).

\* cited by examiner

METAL POWDER FOR 3D PRINTER, SHAPED ARTICLE, AND METHOD FOR MANUFACTURING SHAPED ARTICLE

CROSS-REFERENCE TO RELATED APPLICATIONS

This application is a continuation application of U.S. patent application Ser. No. 16/951,304, filed Nov. 18, 2020, which is a continuation of prior International Application No. PCT/JP2019/021319 filed on May 29, 2019; the entire contents of all of which are incorporated herein by reference.

FIELD

Embodiments relate to a metal powder for 3D printer, and a shaped article.

BACKGROUND

As a new molding technique, a molding technique using a 3D printer (3D printing) is being developed. The 3D printing is a technique in which a three-dimensional solid model is used to directly shape a three-dimensional molding. Examples of the 3D printing processes a molded resin using laser beam. The molded resin can be melted by laser beam, and thus is a material with which a three-dimensional structure is easily formed.

In recent years, it has been tried to manufacture a shaped article from a metal material by using the 3D printing. Examples of the 3D printing uses a metal powder for 3D printer. The 3D printing using the metal powder for 3D printer is a method in which the metal powder for 3D printer is laid tightly, and irradiated with laser beam or electron beam to be solidified.

Examples of the metal powder for 3D printer includes a stainless steel powder. The stainless steel powder can be adjusted in accordance with its average particle diameter. A melting point of the stainless steel is 1400° C. or more and 1500° C. or less. This melting point enables to manufacture a shaped article through the 3D printing. On the other hand, in a method for manufacturing a shaped article using a metal material whose melting point is higher than that of the stainless steel, the shaping property is not always sufficient.

DETAILED DESCRIPTION

A metal powder for 3D printer according to an embodiment is a metal powder for manufacturing a shaped article by using a 3D printer. The metal powder includes a plurality of metal particles.

The metal powder (metal particles) preferably contains, as its major constituent, at least one element selected from the group consisting of tungsten (W), molybdenum (Mo), rhenium (Re), niobium (Nb), tantalum (Ta), chromium (Cr), and vanadium (V). The major constituent is an element whose content is the largest among constituent elements of the metal powder, and the element being the major constituent accounts for 50 atom % or more of the total, for example.

Generally, a melting point of tungsten is 3400° C., a melting point of molybdenum is 2620° C., a melting point of rhenium is 3180° C., a melting point of niobium is 2470° C., a melting point of tantalum is 2990° C., a melting point of chromium is 1905° C., and a melting point of vanadium is 1890° C. The metal whose melting point is 1800° C. or more as above, is called a high melting point metal.

The high melting point metal has a high melting point, and thus requires uniformity in a molten state of metal particles melted by laser beam irradiation. In order to achieve this, it is preferable to control a maximum peak of a particle size distribution and to control a variation in particle size. The control is required more as the melting point becomes higher such that when it is 1800° C. or more and further when it is 2400° C. or more, in particular.

Figure 1:
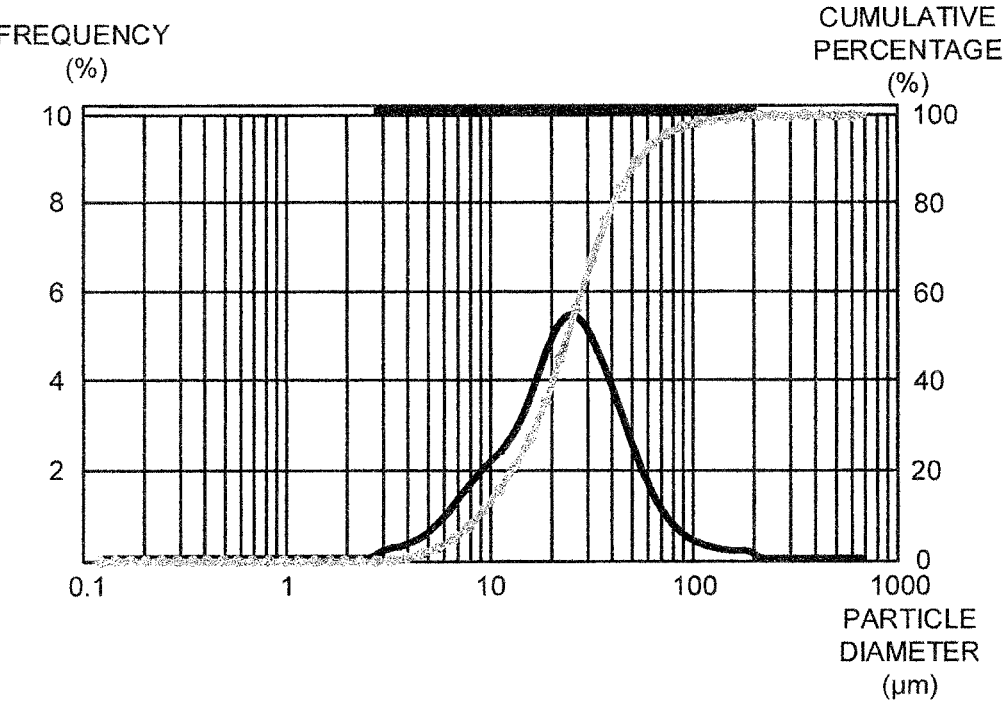
FIG. 1 is a view illustrating an example of a particle size distribution of a metal powder.

FIG. 1 illustrates an example of a particle size distribution of a metal powder (metal particles). A horizontal axis in FIG. 1 indicates a volume average diameter (μm), a vertical axis on the left side indicates a frequency (%), and a vertical axis on the right side indicates a cumulative percentage (%). Further, a scale on the horizontal axis is a logarithmic scale. A graph whose vertical axis indicates a frequency, is called a frequency graph. Further, a graph whose vertical axis indicates a cumulative percentage, is called a cumulative graph.

The particle size distribution is measured by a laser diffraction method. An amount of metal powder used for one time of measurement, is an amount recommended for a measuring device. Generally, an amount of 0.02 g is recommended. Further, a minimum amount is set to 0.01 g, and a maximum amount is set to 0.03 g. Further, a measurement sample is sufficiently stirred and then weighed before the measurement.

A particle size distribution of the metal powder of the embodiment has a maximum peak within a range of particle diameters of 1 μm to 200 μm, and gives a difference $D_{90}-D_{10}$ between $D_{90}$ and $D_{10}$ of 10 μm or more, $D_{90}$ denoting a particle diameter in which an cumulative percentage is 90% in volume proportion, $D_{10}$ denoting a particle diameter in which the cumulative percentage is 10% in volume proportion.

The maximum peak within 1 μm to 200 μm improves flowability of the metal powder. If the maximum peak is less than 1 μm, metal particles are excessively small, and they are likely to agglomerate. If the metal particles agglomerate, a variation in the flowability of the metal powder occurs. If the particle size distribution has a maximum peak within a range of a particle diameter exceeding 200 μm, it becomes difficult to manufacture a shaped article using the 3D printing. The maximum peak of the particle size distribution is more preferably within a range of particle diameters of 10 μm to 150 μm.

The particle size distribution preferably has one peak within the range of particle diameters of 1 μm to 200 μm. Although the number of peaks may be two or more, this may cause the adjustment of $D_{90}-D_{10}$ to be difficult. The peak means a vertex of the particle size distribution. A value of the particle size distribution rises to reach the vertex, and then falls. The value rises and falls to form the peak. If the value does not fall, but rises and an inclination thereof changes in the middle thereof, the peak is not formed.

The particle size distribution is preferably within a range of particle diameters of 0.1 μm to 300 μm. This indicates that the metal powder has no metal particle with a particle diameter of less than 0.1 μm or a particle diameter of larger than 300 μm, when the particle size distribution is determined. When the particle diameter is excessively small or excessively large, the shaping property obtained by the 3D printing may vary. The 3D printing is a technique of performing shaping while irradiating the metal powder with laser beam. Accordingly, if the metal particles have different sizes, the metal particles has a difference of melting conditions of surfaces of the metal particles to be melted by laser beam.

The particle diameter $D_{90}$ and the particle diameter $D_{10}$ can be determined by using the cumulative graph. The maximum peak of the particle size distribution can be determined by using the frequency graph. When the frequency of the particle size distribution is 0%, this means that the metal powder has no metal particle having a corresponding particle diameter.

$D_{90}-D_{10}$ of 10 μm or more is expressed by a equation $D_{90}-D_{10} \geq 10$ μm. A use of the cumulative percentage enables to grasp the total particle diameter distribution. In order to obtain a shaped article with high density, there is required a structure in which small metal particles enter a gap between large metal particles. The satisfaction of $D_{90}-D_{10} \geq 10$ μm, achieves a configuration in which large metal particles and small metal particles exist.

$D_{90}-D_{10}$ of less than 10 μm means that the peak of the particle size distribution is sharp. If the particle diameters are excessively uniform, a gap is likely to be formed between particles, which reduces the shaping property obtained by the 3D printing. $D_{90}-D_{10}$ of 10 μm or more enter small metal particles into a gap between large metal particles to improve the shaping property of the 3D printing. This enables to form a fine shaped article. Concretely, this enables to form a shaped article with density of 90% or more. The density is measured by the Archimedes method.

Although an upper limit of $D_{90}-D_{10}$ is not particularly limited, it is preferably 150 μm or less. If $D_{90}-D_{10}$ exceeds 150 μm, it is difficult to adjust the particle size distribution. $D_{90}-D_{10}$ is preferably 10 μm or more and 150 μm or less, and more preferably 10 μm or more and 100 μm or less. Further, it is still more preferable to satisfy 70 μm$\geq D_{90}-D_{10} \geq 10$ μm.

Figure 2:
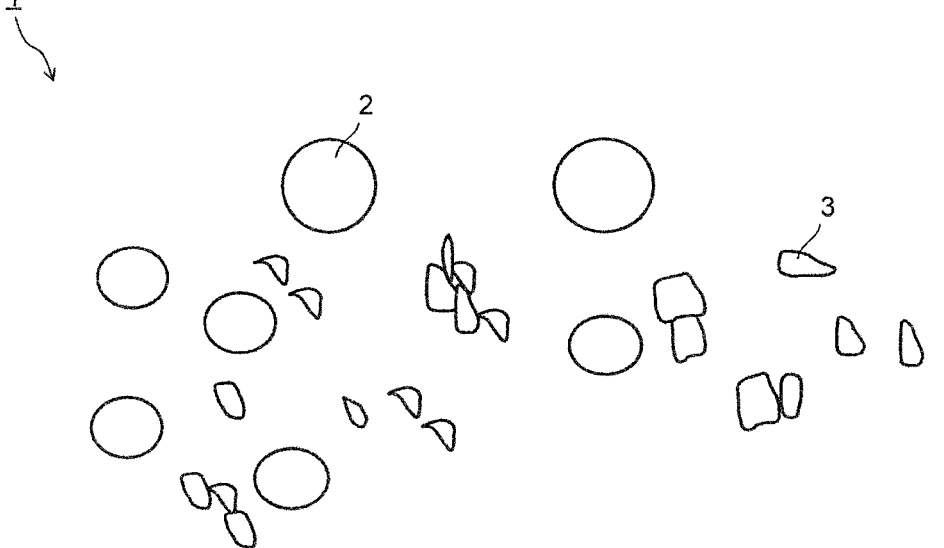
FIG. 2 is a view illustrating an example of a metal particle with high sphericity.
Figure 3:
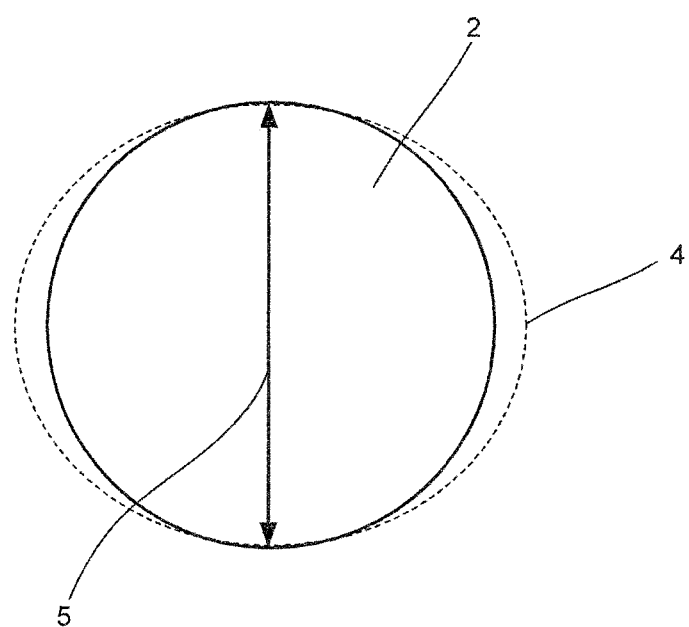
FIG. 3 is a schematic view for explaining the sphericity.

The metal powder (metal particles) preferably includes at least one metal particle having a sphericity of 90% or more. FIG. 2 illustrates an example of a metal particle with high sphericity. FIG. 2 illustrates a metal powder 1 for 3D printer, a metal particle 2 with high sphericity, and a metal particle 3 with low sphericity. FIG. 3 is a schematic view for explaining the sphericity. FIG. 3 illustrates the metal particle 2 with high sphericity, a virtual circle 4, and a maximum diameter 5.

The sphericity is determined by using a macrophotograph. The macrophotograph is a photograph of a scanning electron microscope (SEM) at 100 magnifications or more and 1000 magnifications or less. A contour of the metal particle 2 with high sphericity is photographed in a circular shape in the SEM photograph. This shows that the metal particle 2 is seen with the shape closer to the perfect circle as the sphericity is higher. Specifically, the external appearance of the metal particle 2 is seen as a sphere. The metal particle 3 with low sphericity is seen to have an angular surface in the SEM photograph. This shows that the metal particle 3 with low sphericity is seen to have a polygonal contour.

A method of determining the sphericity is as follows. An area of the virtual circle 4 whose diameter is set to the maximum diameter 5 of the metal particle 2 with high sphericity photographed in the SEM photograph, is determined. The virtual circle 4 is set to a perfect circle. An area of the metal particle 2 with high sphericity photographed in the SEM photograph is determined. The sphericity is determined by an equation of sphericity (%)=(area measured in one particle of metal powder/area of virtual circle whose diameter is set to maximum diameter)×100.

The metal particles preferably include at least one metal particle having the sphericity of 90% or more. The metal powder for 3D printer includes metal particles 2 with high sphericity of 90% or more and metal particles 3 with low sphericity of less than 90%. The metal particles with the sphericity of 90% or more improve the flowability of the metal powder. When the flowability is improved, a supply amount of the metal powder during the shaping through the 3D printing can be controlled constant. When the supply amount can be controlled constant, it is possible to reduce the variation in the shaping property. An upper limit of the sphericity is 100%. The contour may be angular as long as the sphericity is 90% or more. The contour of the metal particle 2 with high sphericity preferably has a circular shape. The metal particles with high sphericity are difficult to become an agglomerate.

Out of the metal particles, at least one metal particle being a primary particle and having a maximum diameter of 1 μm or more, preferably has an aspect ratio within a range of 1.0 or more and 1.5 or less. In the SEM photograph, the primary particle indicates a particle which does not agglomerate. Specifically, the metal particle being the primary particle and having the maximum diameter of 1 μm or more indicates at least one metal particle which does not agglomerate and which has a maximum diameter of 1 μm or more. Such a metal particle preferably has the aspect ratio within the range of 1.0 or more and 1.5 or less. Control of the aspect ratio of the metal particle whose maximum diameter is large to be 1 μm or more, to 1.5 or less, reduces a gap formed around large metal particles. Since it is possible to achieve a structure in which small metal particles enter this gap, the shaping property is improved.

A measuring method of the aspect ratio uses the SEM photograph, which is used when determining the sphericity. A maximum diameter of the primary particle photographed in the SEM photograph is set to a long diameter. A length of the metal particle in a direction perpendicular to the long diameter from a center of the long diameter, is set to a short diameter. The long diameter/the short diameter is set to the aspect ratio. This operation is performed with respect to 50 particles, and an average value thereof is set to an average aspect ratio.

A mass ratio of metal particles each having the maximum diameter of 1 μm or more and the sphericity of 90% or more, is preferably within a range of 0.5 g or more per 10 g of the metal particles. Mixture of 0.5 g or more of metal particles with high sphericity per 10 g of the metal particles, improves their flowability. If the mass ratio is less than 0.5 g per 10 g of the metal particles, the effect of improving the flowability is small. An average particle diameter $D_{90}$ is preferably 60 μm or less. Even when the sphericity is high, if the particle diameter is excessively large, there is a possibility that a gap around large metal particles becomes large, and the shaping property is reduced. An upper limit of the proportion of the metal particles each having the maximum diameter of 1 μm or more and the sphericity of 90% or more, is preferably 5 g or less per 10 g. It is also possible that the metal powder is formed only of the metal particles each having the maximum diameter of 1 μm or more and the sphericity of 90% or more. On the other hand, if the number of spherical metal particles is excessively large, a gap between the metal particles may become large. For this reason, the mass ratio of the metal particles each having the maximum diameter of 1 μm or more and 60 μm or less and the sphericity of 90% or more and 100% or less, is preferably within a range of 0.5 g or more and 5 g or less per 10 g. The increase in the mass ratio of the metal particles with high sphericity, leads to an increase in cost.

Method examples of adjusting the mass ratio of the metal particles each having the maximum diameter of 1 μm or more and the sphericity of 90% or more, include a method in which a metal powder including metal particles with high sphericity and a metal powder including metal particles with low sphericity are separately produced, and then mixed. When the mass ratio is determined from the mixed powder, a method of arbitrarily extracting a metal powder of 10 g and performing SEM observation, is also effective. By the SEM observation, an area ratio between the powder with high sphericity and the powder with low sphericity is determined. The area ratio can be converted into a mass ratio by being multiplied by a specific gravity of the metal particle. Other than the above, there is also a method of determining a mass ratio by classifying the powder with high sphericity and the powder with low sphericity. When the metal powder including the metal particles with high sphericity and the metal powder including the metal particles with low sphericity are mixed, as long as they are of the same material, the area ratio and the mass ratio have substantially the same value.

In the metal powder for 3D printer of the embodiment, a ratio of a bulk density to a true density is preferably 15% or more. The ratio of the bulk density to the true density is also referred to as a relative density. The relative density can express a filling density of the metal powder. The relative density is determined by an equation: (bulk density/true density)×100(%).

The true density is a value obtained by dividing a mass of a metal powder itself after pores on a surface or inside thereof are removed, by a volume of the metal powder. When a single metal is employed, the true density becomes the same as the specific gravity. For example, the true density of tungsten is 19.3 $g/cm^3$, the true density of molybdenum is 10.2 $g/cm^3$, the true density of rhenium is 21.0 $g/cm^3$, the true density of niobium is 8.6 $g/cm^3$, and the true density of tantalum is 16.7 $g/cm^3$. Further, the true density of an alloy can also be calculated from the specific gravity of each of components.

The bulk density is a density measured by putting a metal powder into a measuring container, in which a gap in the measuring container is also regarded as a volume. The bulk density is also referred to as an apparent density. A density measured by further filling the metal powder in a gap formed by applying vibration to the measuring container containing the metal powder, is referred to as a tap density. The tap density is also one kind of the bulk density.

As the bulk density, the apparent density is employed. The apparent density is measured based on ASTM-B329-98 (Apparent Density of Metal Powder and Compounds Using the Scott Volumeter) being one of standards of American Society for Testing and Materials (ASTM). Further, as the measuring container in which the metal powder is put, a container with a diameter of 28 mm and a height of 20 mm is used.

When the relative density is 15% or more, this means that the metal powder for 3D printer has a predetermined filling density without being subjected to application of vibration. When the metal powder has the predetermined filling density, it is possible to stabilize the existing proportion of the metal powder in the 3D printing. Although an upper limit of the relative density is not particularly limited, it is preferably 80% or less. When the relative density exceeds 80%, the density is excessively high, which may reduce the flowability. The relative density is preferably 15% or more and 80% or less, and more preferably 30% or more and 80% or less.

The metal powder for 3D printer as described above is excellent in the flowability and the shaping property. Consequently, the metal powder for 3D printer is suitable for shaping a shaped article with the use of the 3D printing.

Figure 4:
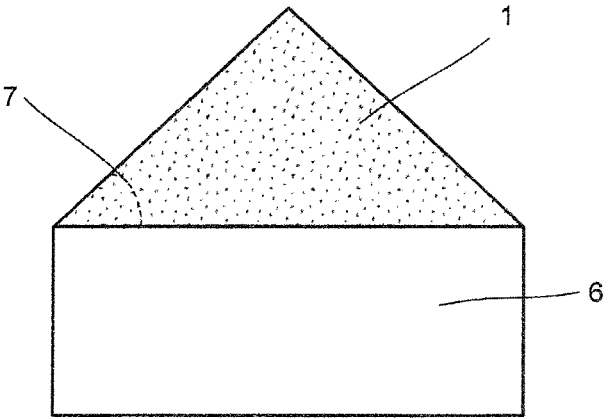
FIG. 4 is a schematic view for explaining a repose angle.

The flowability can be evaluated by measuring a repose angle. The repose angle is preferably 65 degrees or less. The repose angle is measured by using a Scott volumeter according to TMIAS0101 (powder property test method: 2010). An example of the Scott volumeter is illustrated in FIG. 4. The TMIAS0101 is an industry standard issued by Japan Tungsten & Molybdenum Industries Association. As the Scott volumeter, it is also possible to use a volumeter based on ASTM-B329-98 described above.

FIG. 4 is a schematic view for explaining the repose angle. FIG. 4 illustrates a metal powder 1 for 3D printer, a cup 6, and a repose angle 7. The repose angle 7 is measured by using the Scott volumeter. The metal powder 1 for 3D printer is poured into a large funnel of the Scott volumeter. The metal powder 1 for 3D printer is poured until when it fills the cup 6 and overflows to the periphery of the cup 6. The repose angle 7 made by an upper surface of the cup and each of both ends of a pile of the metal powder 1 for 3D printer is measured, and an average angle thereof is set to a repose angle. When the metal powder 1 for 3D printer does not fall naturally to the cup 6, the metal powder on a wire mesh is lightly stirred with a brush to be poured into the cup 6. The cup 6 is a cup with a diameter of 28 mm and a height of 20 mm. As the samples when measuring the repose angle, the same sample may be used, or respectively new samples may also be used.

The repose angle of 65 degrees or less, indicates good flowability. When the flowability is good, it is possible to uniformly supply the powder onto a stage of the 3D printer. For this reason, the repose angle is preferably 65 degrees or less, and more preferably 60 degrees or less. The repose angle is still more preferably 50 degrees or less.

When an arbitrary powder is prepared and the flowability thereof is measured, a variation in the repose angle is preferably 5 degrees or less. The variation in the repose angle is determined by |an average value of repose angles calculated five times–the most distant value|. For example, when the repose angles are 45 degrees, 44 degrees, 42 degrees, 39 degrees, and 40 degrees, an average value is 42 degrees. The values which are the most distant from 42 degrees, are 45 degrees and 39 degrees. For this reason, the variation in the flowability is |42−45|=3 degrees, or |42−39|=3 degrees. By preventing the variation in the flowability, it is possible to stabilize the uniformity of powder on the stage.

Although a lower limit value of the repose angle is not particularly limited, it is 30 degrees or more. When the repose angle is smaller than 30 degrees, the flowability becomes excessively high, resulting in that the variation in the repose angle is likely to be increased.

Next, a method for manufacturing the metal powder for 3D printer will be described. The method for manufacturing the metal powder for 3D printer according to the embodiment is not particularly limited as long as the metal powder has the aforementioned configuration, but, as a method of obtaining the metal powder with good yield, the following method can be cited.

First, an intended metal powder is prepared. The metal powder preferably contains, as its major constituent, at least one element selected from the group consisting of tungsten, molybdenum, rhenium, niobium, tantalum, chromium, and vanadium.

Next, it is preferable to perform a classification operation for controlling the particle size distribution, the particle diameter $D_{90}$, the particle diameter $D_{10}$, and the particle diameter range. For the classification operation, plural sieves with different openings ($\mu$m) are prepared. It is preferable to remove particles with small particle diameters and particles with large particle diameters. By adjusting the openings of the sieves, the particle size is adjusted at intervals of 10 $\mu$m or more and 50 $\mu$m or less. It is also possible to cite a method in which metal particles within the predetermined particle size range are mixed, to thereby control the particle size distribution and the like. For controlling the particle size distribution, there is also a method of utilizing airflow classification. It is also possible to combine both the method using the sieves and the airflow classification.

For example, there can be cited a method in which metal particles having particle diameters of 10 $\mu$m or more and 50 $\mu$m or less, 51 $\mu$m or more and 100 $\mu$m or less, 101 $\mu$m or more and 150 $\mu$m or less, 151 $\mu$m or more and 200 $\mu$m or less, and 201 $\mu$m or more and 250 $\mu$m or less, are prepared, and required amounts thereof are mixed. As described above, it is preferable to employ the method in which the metal powders whose particle sizes are adjusted at intervals of 10 $\mu$m or more and 50 $\mu$m or less are mixed, to thereby control the particle size distribution.

It is also effective to previously grind an agglomerate powder by using a grinder. By grinding the agglomerate powder, it becomes easy to control the particle size distribution based on the particle diameter of the primary particle. Examples of the grinder include a ball mill, a rod mill, a Semi-Autogenous Grinding (SAG) mill, and a jet mill.

The metal powder with the sphericity of 90% or more is prepared, and a required amount thereof is added. It is also possible that the metal powder for 3D printer is formed only of the metal powder with the sphericity of 90% or more. A method in which the metal powder with the sphericity of 90% or more is classified, and a required amount thereof is added, is also effective.

Method examples for manufacturing the metal powder with the sphericity of 90% or more, include atomization processing, grinding processing, and granulation processing.

The atomization processing is a method in which molten metal is jetted from a hole, and a flowed-out molten metal flow is blown by a high-pressure water or gas, to be scattered and solidified. Since the melted metal is solidified while being scattered, it is possible to produce a metal particle having a smooth surface and high sphericity. Examples of the atomization processing include a method in which metal particles are jetted, and are melted and solidified through high-frequency heating. Examples of the atomization processing include a gas atomization method, a water atomization method, and a centrifugal atomization method.

Examples of the grinding processing include a method of grinding a metal ingot. The method of grinding the metal ingot is a method of performing grinding by using a grinder such as a ball mill. When the metal ingot is ground, an angular powder is formed. The grinding processing using the grinder forms a powder which is rounded and thus has high sphericity. The grinding processing using the grinder also has an effect of grinding the agglomerate powder.

The grinding processing also effectively use a rotating electrode process (REP). In the rotating electrode process, a rotating electrode is melted by high-temperature plasma, and scattered as liquid drops by centrifugal force. The rotating electrode process is a method in which the liquid drops are ground by gas jet to be finely powdered.

Method examples of increasing the sphericity include a method of using the granulation processing. The granulation processing is processing in which fine powders are solidified into a spherical shape. Examples of the processing include a method in which the metal powder is mixed with a resin binder to be turned into a spherical shape. When the metal powder is a high melting point metal, examples of the processing include a method of using a low melting point metal as a binder. Examples of the low melting point metal preferably has a melting point of 1500° C. or less. Examples of such metal include copper (whose melting point is 1085° C.), aluminum (whose melting point is 660° C.), and nickel (whose melting point is 1455° C.). As described above, the granulated powder uses the binder. For this reason, the granulated powder can be distinguished from a simple agglomerate powder.

When the methods as described above are used, it is possible to manufacture the metal powder for 3D printer in which the particle size distribution has the maximum peak within the range of the particle diameters of 1 $\mu$m to 200 $\mu$m, and $D_{90}-D_{10}$ is 10 $\mu$m or more.

A use of the 3D printing using the metal powder for 3D printer of the embodiment enables to manufacture a shaped article having a molding made from the metal powder. The shaped article can be applied to one having various structures. Examples of the structure include a fin structure, a lattice structure, a plate structure, a bar structure, a column structure, a honeycomb structure, a hollow structure, and a spring structure.

A use of the metal powder of the embodiment, even if the metal powder is the high melting point metal, it is possible to achieve the 3D printing excellent in the flowability and the shaping property. Conventionally, the high melting point metal is a material that is difficult to be sintered, so that by heating a molding at a high temperature, a sintered compact is formed. The sintered compact is subjected to cutting or the like to form a complicated shape, so that formation thereof is difficult. On the contrary, the shaped article according to the embodiment can be shaped using the 3D printing, so that the shaped article can be easily formed in a complicated shape.

Examples of the 3D printing include a method of using laser beam or electron beam. The 3D printing using laser beam is called selective laser sintering (SLS). Examples of the selective laser sintering include direct metal laser sintering (DMLS). The SLS is a method in which a powder material is laid tightly on a shaping stage and is irradiated with laser beam. The irradiation of laser beam melts the powder material, and when it is cooled thereafter, the shaping is performed. The SLS is a method in which a process of newly supplying the powder material and performing the laser beam irradiation after the shaping, is repeatedly performed.

The DMLS is the selective laser sintering with increased laser output power. The SLS uses carbon dioxide gas laser. The DMLS uses ytterbium laser.

The SLS and the DMLS are methods of sintering the powder material using the laser beam. As a method of using the laser beam, there can also be cited selective laser melting (SLM). The SLM is a method in which the powder material is melted by laser beam irradiation, to thereby perform shaping.

The 3D printing using the electron beam is called electron beam melting (EBM). The electron beam is a beam of irradiating electrons emitted as a result of heating a filament in vacuum. The electron beam is characterized in that it has high output power and high speed when compared to the laser beam. The EBM is a technique in which a powder material is melted to be shaped. The EBM also includes a method of performing shaping by using a metal wire. When the aforementioned high melting point metal is shaped by the 3D printer, it is preferable to employ the SLM or the EBM. The SLM or the EBM is a method of melting metal particles. The melting of metal particles makes it easier to obtain a shaped article with high density.

The SLS (including the DMLS) preferably has laser output power of 100 W or more. The SLM preferably has laser output power of 100 W or more. The EBM preferably has output power of electron beam of 2000 W or more.

The SLS, the SLM, or the EBM preferably has a shaping speed of 100 mm/s or more. The shaping speed is a speed of scanning laser beam or electron beam. When the shaping speed is less than 100 mm/s, the shaping speed is slow and mass productivity is reduced. Although an upper limit of the shaping speed is not particularly limited, it is preferably 5000 mm/s or less. In the case of the high melting point metal, when the shaping speed is more than 5000 mm/s, a variation occurs in a sintered state or a molten state, resulting in that it becomes difficult to obtain a shaped article with high density.

In the 3D printing, a step of laying a metal powder and solidifying the metal powder through laser beam irradiation is performed, and a step of laying the metal powder onto the solidified metal powder, and solidifying the metal powder through laser beam irradiation, is repeatedly performed. By improving the flowability, it is possible to uniformly supply the metal powder. By using the metal powder whose bulk density is within the predetermined range, it is possible to stabilize an existing amount of the metal powder. Consequently, it is possible to lay the metal powder while reducing a gap between the metal powders, which improves the shaping property. For this reason, even when the high melting point metal is employed, it is possible to manufacture a shaped article through the 3D printing with good yield. Further, it is possible to obtain a shaped article having a molding with high density. A relative density or an average density of the molding is preferably 90% or more. By making the metal particles with high sphericity to be contained, it is possible to improve adhesiveness between the metal particles. Also from this point, it is possible to obtain a shaped article with high density. Besides, it is possible to perform shaping through the 3D printing in which a density variation of a shaped article is reduced.

When the metal powder is tightly laid to perform shaping through the 3D printing, particle diameters of all metal particles are preferably set to be smaller than a thickness at which the metal powder is tightly laid. As a method of tightly laying the metal powder to perform shaping through the 3D printing, there is one called powder bed fusion. In the powder bed fusion, a surface layer of the tightly-laid metal powder is flattened with a coater (a jig in a flat plate shape). If the particle diameters of the metal particles are larger than the thickness at which the metal powder is tightly laid, the metal particle is caught by the coater. Accordingly, a distribution state of the metal particles is changed by the caught portion. For this reason, the particle diameters of all metal particles are preferably set to be smaller than the thickness at which the metal powder is tightly laid.

EXAMPLES

Examples 1 to 20, Comparative Examples 1, 2

As metal powders for 3D printer, metal powders represented in Table 1 and Table 2 were prepared. For a tungsten powder of each of examples 1 to 8 and a comparative example 1, one having purity of 99 mass % or more was used. For a molybdenum powder of each of examples 9 to 15 and a comparative example 2, one having purity of 99 mass % or more was used. Further, in an example 16, a rhenium powder with purity of 99 mass % or more was used. In an example 17, a niobium powder with purity of 99 mass % or more was used. In an example 18, a tantalum powder with purity of 99 mass % or more was used. In an example 19, a hafnium carbide (HfC) powder of 0.7 mass % and a tungsten powder of 99.3 mass % were mixed. In an example 20, a titanium (Ti) powder of 0.5 mass % and a molybdenum powder of 99.5 mass % were mixed.

Metal particles each having a maximum diameter of 1 μm or more and 30 μm or less and sphericity of 90% or more and 100% or less were prepared, and mixed so that a mass ratio of the metal particles each having the maximum diameter of 1 μm or more and the sphericity of 90% or more, per 10 g, satisfied values shown in Table 1 or Table 2. Each of the metal particles each having the maximum diameter of 1 μm or more and 30 μm or less and the sphericity of 90% or more and 100% or less, had an aspect ratio within a range of 1.0 or more and 1.5 or less.

The adjustment of the particle size distribution was performed by a method of mixing previously-sieved metal particles. The metal particles with the sphericity of 90% or more and 100% or less, were manufactured by the atomization processing. The particle size distribution of each of the metal powders according to the examples and the comparative examples, was adjusted to fall within a range of particle diameters of 0.1 μm to 300 μm. FIG. 1 illustrates a particle size distribution of the metal powder according to the example 1.

An observation area of 100 μm×100 μm was photographed by SEM (at 1000 magnifications). "A proportion of metal particles each having the maximum diameter of 1 μm or more and the sphericity of 90% or more" per observation area, was indicated by an area ratio. This operation was performed at arbitrary three places, and an average value thereof was shown. When the area ratio being "the proportion of metal particles each having the maximum diameter of 1 μm or more and the sphericity of 90% or more" is 100%, this means that each of all metal particles has the maximum diameter of 1 μm or more and the sphericity of 90% or more. It is indicated that the smaller the area ratio, the less "the proportion of metal particles each having the maximum diameter of 1 μm or more and the sphericity of 90% or more".

TABLE 1

| | | Maximum peak of particle size distribution (μm) | $D_{10}$ (μm) | $D_{90}$ (μm) | $D_{90} - D_{10}$ (μm) | Area ratio of metal particles having maximum diameter of 1 μm or more and sphericity of 90% or more (%) |
|---|---|---|---|---|---|---|
| | Material | | | | | |
| Example 1 | Tungsten | 50 | 2 | 108 | 106 | 0 |
| Example 2 | Tungsten | 20 | 10 | 47 | 37 | 0 |
| Example 3 | Tungsten | 8 | 3 | 56 | 53 | 20 |
| Example 4 | Tungsten | 10 | 5 | 42 | 37 | 30 |

TABLE 1-continued

| | Material | Maximum peak of particle size distribution (μm) | $D_{10}$ (μm) | $D_{90}$ (μm) | $D_{90} - D_{10}$ (μm) | Area ratio of metal particles having maximum diameter of 1 μm or more and sphericity of 90% or more (%) |
|---|---|---|---|---|---|---|
| Example 5 | Tungsten | 8 | 4 | 16 | 12 | 50 |
| Example 6 | Tungsten | 18 | 6 | 28 | 22 | 70 |
| Example 7 | Tungsten | 110 | 50 | 200 | 150 | 97 |
| Example 8 | Tungsten | 26 | 15 | 37 | 22 | 100 |
| Comparative example 1 | Tungsten | 5 | 2 | 7 | 5 | 0 |

TABLE 2

| | Material | Maximum peak of particle size distribution (μm) | $D_{10}$ (μm) | $D_{90}$ (μm) | $D_{90} - D_{10}$ (μm) | Area ratio of metal particles having maximum diameter of 1 μm or more and sphericity of 90% or more (%) |
|---|---|---|---|---|---|---|
| Example 9 | Molybdenum | 40 | 55 | 120 | 65 | 10 |
| Example 10 | Molybdenum | 10 | 4 | 20 | 16 | 0 |
| Example 11 | Molybdenum | 37 | 3 | 65 | 62 | 50 |
| Example 12 | Molybdenum | 12 | 5 | 36 | 31 | 30 |
| Example 13 | Molybdenum | 10 | 2 | 25 | 23 | 10 |
| Example 14 | Molybdenum | 26 | 6 | 47 | 41 | 97 |
| Example 15 | Molybdenum | 28 | 8 | 31 | 23 | 100 |
| Comparative example 2 | Molybdenum | 5 | 0.7 | 9 | 8.3 | 0 |
| Example 16 | Rhenium | 42 | 27 | 51 | 24 | 35 |
| Example 17 | Niobium | 26 | 12 | 46 | 34 | 40 |
| Example 18 | Tantalum | 27 | 21 | 39 | 18 | 45 |
| Example 19 | Tungsten alloy | 8 | 3 | 36 | 33 | 20 |
| Example 20 | Molybdenum alloy | 19 | 25 | 67 | 42 | 30 |

The flowability of the metal powder for 3D printer according to each of the examples and the comparative examples was examined. The flowability was evaluated by measuring the repose angle. The Scott volumeter was prepared, a sample was poured into a large funnel, and poured until when it filled a cup and overflowed to the periphery of the cup. When the metal powder did not fall naturally, the metal powder on a wire mesh was lightly stirred with a brush to be poured into the cup. After the powder was poured until when it overflowed to the periphery of the cup, an angle made by an upper surface of the cup and the powder was measured. This operation was performed five times by using arbitrarily extracted powders, an average value thereof was determined as the repose angle, and a variation was determined. The variation corresponds to a deviation angle relative to the average value of the repose angle. As the Scott volumeter, one based on ASTM-B329-98 was used.

The bulk density was also examined. As the measurement of the bulk density, the apparent density based on ASTMB-329-98 was measured. The measurement of the repose angle and the bulk density was performed by using a container with a diameter of 28 mm and a height of 20 mm. Based on this, a ratio between the bulk density and the true density (relative density) was determined by (bulk density/true density)×100(%). Results thereof are shown in Table 3.

TABLE 3

| | Repose angle (degree) | Relative density (%) |
|---|---|---|
| Example 1 | 56 | 33.7 |
| Example 2 | 49 | 17.7 |
| Example 3 | 47 | 21.5 |
| Example 4 | 44 | 32.4 |
| Example 5 | 43.5 | 27.4 |
| Example 6 | 35 | 44.2 |
| Example 7 | 32 | 46.3 |
| Example 8 | 31 | 56.8 |
| Comparative example 1 | 75 | 13.5 |
| Example 9 | 53 | 36.6 |
| Example 10 | 55 | 19.1 |
| Example 11 | 40 | 32.7 |
| Example 12 | 48 | 47 |
| Example 13 | 50 | 38.2 |
| Example 14 | 32 | 47.8 |
| Example 15 | 32 | 50.2 |
| Comparative example 2 | 74 | 13.5 |
| Example 16 | 55 | 25.9 |
| Example 17 | 57 | 55.7 |
| Example 18 | 60 | 43.3 |
| Example 19 | 54 | 26.1 |
| Example 20 | 53 | 28.6 |

As can be understood from Tables, as "the proportion of metal particles each having the maximum diameter of 1 μm or more and the sphericity of 90% or more" was increased, the flowability was improved.

Next, by using the metal powder for 3D printer according to each of the examples and the comparative examples, a shaped article having a molding was manufactured through the 3D printing. The molding has a fin structure or a hollow structure. The fin structure has five projections each having a height of 2 mm and a diameter of 2 mm, on a metal plate. The hollow structure has an outside diameter of 10 mm, an inside diameter of 8 mm, and a height of 5 mm.

As the 3D printers, two types of SLM type and EBM type were prepared. In the SLM type, the 3D printing was performed at laser output power of 400 W and a shaping speed of 300 mm/s. In the SLM type, the 3D printing was performed through powder bed fusion. In the powder bed fusion, particle diameters of metal particles were set to be smaller than a thickness of tightly-laid metal powder. In the EBM type, the 3D printing was performed at electron beam output power of 3500 W and a shaping speed of 1000 mm/s.

A density of each of the obtained shaped articles was measured. The density was measured based on the Archimedes method. Ten shaped articles were manufactured by using each of the metal powders for 3D printer. An average value of the densities of the ten shaped articles was set to an average density. A deviation relative to the average density was set to a density variation. Results thereof are shown in Table 4.

TABLE 4

| | SLM | | EBM | |
|---|---|---|---|---|
| | Average density (%) | Density variation (%) | Average density (%) | Density variation (%) |
| Example 1 | 90 | −3 to +2 | 92 | −3 to +3 |
| Example 2 | 92 | −3 to +3 | 94 | −3 to +3 |
| Example 3 | 94 | −3 to +2 | 96 | −2 to +2 |
| Example 4 | 95 | −3 to +3 | 96 | −2 to +2 |
| Example 5 | 97 | −3 to +2 | 98 | −1 to +1 |
| Example 6 | 97 | −3 to +2 | 98 | −1 to +1 |
| Example 7 | 94 | −3 to +3 | 95 | −2 to +2 |
| Example 8 | 95 | −2 to +3 | 95 | −2 to +2 |
| Comparative example 1 | 68 | −5 to +5 | 74 | −4 to +5 |
| Example 9 | 92 | −3 to +3 | 94 | −2 to +2 |
| Example 10 | 90 | −3 to +3 | 92 | −3 to +3 |
| Example 11 | 93 | −2 to +3 | 95 | −2 to +2 |
| Example 12 | 95 | −3 to +2 | 97 | −2 to +2 |
| Example 13 | 95 | −3 to +2 | 97 | −2 to +2 |
| Example 14 | 96 | −2 to +2 | 98 | −2 to +2 |
| Example 15 | 97 | −2 to +2 | 98 | −1 to +1 |
| Comparative example 2 | 70 | −6 to +5 | 77 | −5 to +3 |
| Example 16 | 94 | −2 to +3 | 96 | −2 to +2 |
| Example 17 | 93 | −3 to +3 | 95 | −2 to +2 |
| Example 18 | 91 | −3 to +2 | 93 | −2 to +2 |
| Example 19 | 92 | −3 to +3 | 93 | −2 to +2 |
| Example 20 | 90 | −3 to +3 | 92 | −2 to +2 |

As can be understood from Table, the shaping property of the metal powder according to each of the examples was improved. The shaping property of the metal powder including the metal particles each having the maximum diameter of 1 μm and the sphericity of 90% or more and 100% or less, was improved in particular. The high density was obtained in either of the case where the shaping was performed by the SLM method and the case where the shaping was performed by the EBM method. For this reason, the metal powder according to each of the examples is a powder suitable for the shaping through the 3D printer.

While certain embodiments of the present invention have been exemplified, these embodiments have been presented by way of example only, and are not intended to limit the scope of the inventions. Indeed, the novel embodiments described herein may be embodied in a variety of other forms; furthermore, various omissions, substitutions and changes may be made without departing from the spirit of the inventions. The inventions described in the accompanying claims and their equivalents are intended to cover such forms or modifications as would fall within the scope and spirit of the inventions. The above-described respective embodiments can be carried out by being combined with each other.

What is claimed is:

1. A method for manufacturing a metal powder for 3D printer, the method comprising:

preparing first metal particles, each first metal particle having a first sphericity of 90% or more and a maximum diameter of 1 μm or more;

preparing second metal particles, each second metal particle having a second sphericity of less than 90%; and mixing the first metal particles and the second metal particles to form mixed metal particles, wherein each first metal particle contains 50 atom % or more of at least one element selected from the group consisting of tungsten, molybdenum, rhenium, niobium, tantalum, chromium, and vanadium, wherein each second metal particle contains 50 atom % or more of at least one element selected from the group consisting of tungsten, molybdenum, rhenium, niobium, tantalum, chromium, and vanadium, wherein the first metal particles and the second metal particles are the same in their compositions, wherein the first metal particles are manufactured using atomization processing, grinding processing, or granulation processing, wherein at least one of the second metal particles has a polygonal contour, wherein a particle size distribution of the mixed metal particles has a maximum peak within particle diameters of 1 μm to 200 μm, wherein the particle size distribution gives a difference $D_{90}-D_{10}$ of 10 μm or more between $D_{90}$ and $D_{10}$, $D_{90}$ denoting a particle diameter in which a cumulative percentage is 90% in volume proportion, and $D_{10}$ denoting a particle diameter in which a cumulative percentage is 10% in volume proportion, wherein $D_{10}$ is 27 μm or less, wherein $D_{90}$ is 60 μm or less, and wherein an area ratio of metal particles having a maximum diameter of 1 μm or more and sphericity of 90% or more to the mixed metal particles in an observation area of 100 μm×100 μm observed by a scanning electron microscope, is 10% or more and 70% or less.

2. The method according to claim 1, wherein the particle size distribution is within 0.1 μm to 300 μm.

3. The method according to claim 1, wherein the metal powder has a ratio of a bulk density to a true density is 15% or more.

4. The method according to claim 1, wherein the maximum diameter of each first metal particle is 1 μm or more and 60 μm or less.

5. The method according to claim 1, wherein the metal powder has a ratio of a bulk density to a true density is 15% or more and 80% or less.

6. The method according to claim 1, wherein the particle size distribution has the maximum peak within particle diameters of 8 μm to 200 μm.

7. The method according to claim 1, wherein at least one of the second metal particles has an angular surface.

8. The method according to claim 1, wherein a mass ratio of the first metal particles is 0.5 g or more and 5 g or less per 10 g of the mixed metal particles.

9. The method according to claim 1, wherein the mixed metal particles have a repose angle of 40° or more and 60° or less.

\* \* \* \* \*